(12) United States Patent
Suchy et al.

(10) Patent No.: US 11,163,048 B2
(45) Date of Patent: Nov. 2, 2021

(54) PIEZOELECTRIC TRANSDUCER CONTROLLER HAVING MODEL-BASED SIDEBAND BALANCING

(71) Applicant: SEMICONDUCTOR COMPONENTS INDUSTRIES, LLC, Phoenix, AZ (US)

(72) Inventors: Tomas Suchy, Brno (CZ); Jiri Kantor, Hrusky (CZ); Marek Hustava, Bratislava (SK)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 216 days.

(21) Appl. No.: 16/724,783

(22) Filed: Dec. 23, 2019

(65) Prior Publication Data
US 2020/0400803 A1    Dec. 24, 2020

Related U.S. Application Data

(60) Provisional application No. 62/864,361, filed on Jun. 20, 2019.

(51) Int. Cl.
*G01S 7/527*   (2006.01)
*G01S 15/931*   (2020.01)
(Continued)

(52) U.S. Cl.
CPC .............. *G01S 7/5273* (2013.01); *G01S 7/53* (2013.01); *G01S 15/104* (2013.01); *G01S 15/931* (2013.01); *G01S 2015/938* (2013.01)

(58) Field of Classification Search
CPC ........ G01S 7/5273; G01S 15/931; G01S 7/53; G01S 15/104; G01S 2015/938;
(Continued)

(56) References Cited

U.S. PATENT DOCUMENTS

2005/0026238 A1* 2/2005 Berndt ............. G01N 33/54386
                                                          435/34
2019/0025415 A1    1/2019 Suchy et al.
(Continued)

FOREIGN PATENT DOCUMENTS

CN         112114608 A  * 12/2020
EP           2899563 A1    7/2015
RU         2011119221 A    8/2009

*Primary Examiner* — Daniel Pihulic
(74) *Attorney, Agent, or Firm* — Ramey & Schwaller, LLP

(57) ABSTRACT

Various sensors, sensor controllers, and sensor control methods are provided with model-based sideband balancing. In one illustrative embodiment, a controller for a piezoelectric transducer includes a transmitter, a receiver, and a processing circuit coupled to the transmitter and receiver. The processing circuit performs calibration and echo detection, the calibration including: sensing the piezoelectric transducer's phase response as a function of frequency; deriving equivalent circuit parameters for the piezoelectric transducer from the phase response; and determining a sideband imbalance based on one or more of the equivalent circuit parameters. Once the sideband imbalance is identified, the processing circuit may perform echo-detection processing that accounts for the sideband imbalance.

20 Claims, 5 Drawing Sheets

(51) Int. Cl.
*G01S 15/10* (2006.01)
*G01S 7/53* (2006.01)

(58) Field of Classification Search
CPC ... G01S 7/52004; B06B 1/06; B06B 2201/55; B06B 2201/40; B06B 1/0215
See application file for complete search history.

(56) References Cited

U.S. PATENT DOCUMENTS

2019/0079173 A1* 3/2019 Kutej ................... G01S 7/52004
2019/0079174 A1* 3/2019 Kutej ..................... G01H 13/00
2020/0400803 A1* 12/2020 Suchy ................... G01S 7/5273

* cited by examiner

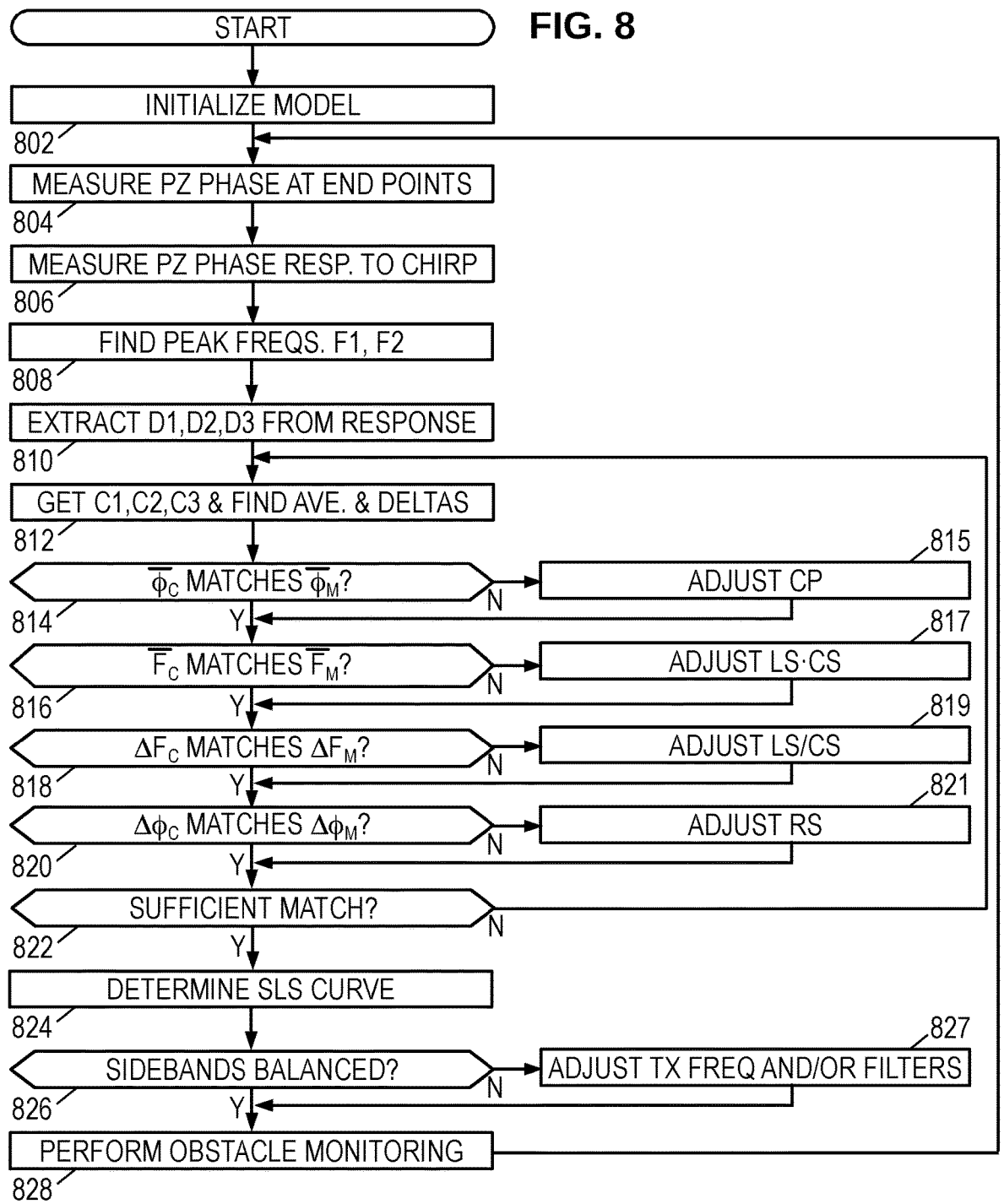

PIEZOELECTRIC TRANSDUCER CONTROLLER HAVING MODEL-BASED SIDEBAND BALANCING

CROSS REFERENCE TO RELATED APPLICATIONS

The present application claims priority to provisional U.S. App. 62/864,361, filed 2019 Jun. 20 and titled "In-field piezo model calculation" by inventors M. Hustava, T. Suchy, and J. Kantor. This provisional is hereby incorporated herein by reference in its entirety. The present application further relates to co-pending U.S. application Ser. No. 15/888,471, filed 2018 Feb. 5 and titled "Composite Acoustic Bursts for Multi-channel Sensing" by inventors T. Suchy, M. Kassa, and M. Hustava. This co-pending application is hereby incorporated herein by reference in its entirety.

BACKGROUND

Modern automobiles are equipped with an impressive number and variety of sensors. For example, cars are now routinely equipped with arrays of piezoelectric sensors to monitor distances between the car and any nearby persons, pets, vehicles, or other obstacles. Due to environmental "noise" and safety concerns, each of the sensors may be asked to provide tens of measurements each second while the car is in motion. It is important for such sensor arrays to perform reliably.

As the number of sensors increases, so too does the need for multiple sensors to operate concurrently, increasing the risk of interference between the sensors. Because acoustic bursts from multiple sensors may be "in flight" at the same time, the echoes from bursts by a first sensor may be detected by other sensors and become erroneously associated with other bursts, leading to incorrect time-of-flight determinations and erroneous distance measurements. Related application Ser. No. 15/888,471 ("Composite Acoustic Bursts for Multi-channel Sensing") addresses this issue by employing signal sideband energy to associate acoustic bursts with their originating sensors. However, the sideband attenuation depends on various factors including temperature, sensor aging, and external loading of the transducer. If the sidebands become unbalanced (subject to unequal attenuation), the accuracy of the sensors' time-of-flight determinations may be adversely affected.

SUMMARY

Accordingly, there are disclosed herein various sensors, sensor controllers, and sensor control methods with model-based sideband balancing. In one illustrative embodiment, a controller for a piezoelectric transducer includes a transmitter, a receiver, and a processing circuit coupled to the transmitter and receiver. The transmitter drives the piezoelectric transducer. The receiver senses a response of the piezoelectric transducer. The processing circuit performs calibration and echo detection, the calibration includes: sensing the piezoelectric transducer's phase response as a function of frequency; deriving equivalent circuit parameters for the piezoelectric transducer from the phase response; and determining a sideband imbalance based on one or more of the equivalent circuit parameters.

One illustrative embodiment of a method for operating a piezoelectric-based sensor includes: sensing a phase response of a piezoelectric transducer as a function of frequency; deriving equivalent circuit parameters for the piezoelectric transducer from the phase response; determining a sideband imbalance based on one or more of the equivalent circuit parameters; and performing echo-detection processing that accounts for the sideband imbalance.

An illustrative sensor embodiment includes: a piezoelectric transducer and a controller. The controller drives the piezoelectric transducer and senses a phase response of the piezoelectric transducer as a function of frequency. The controller includes a processing circuit that accounts for an estimated sideband imbalance when performing echo-detection processing, the sideband imbalance being estimated based on equivalent circuit parameters derived from the phase response.

Each of the foregoing embodiments may be employed individually or together, and in conjunction with any one or more of the following optional features: 1. the equivalent circuit parameters include a capacitance $C_S$, an inductance $L_S$, and a resistance $R_S$ of a series branch and a capacitance $C_P$ of a capacitor in parallel with the series branch. 2. the parameters are for an equivalent circuit that further includes an inductance $L_P$ of an inductor in parallel with the series branch and a resistance $R_{LP}$ of said inductor. 3. said deriving includes determining a linear (or nonlinear) phase correction for the sensed phase response based on a comparison of points on the sensed phase response with points on an equivalent circuit phase response. 4. said deriving includes: finding a peak and a valley in the sensed phase response. 5. said deriving includes: adjusting the capacitance $C_P$ based on a comparison of the average phase for the peak of the sensed phase response to an average phase for the peak of an equivalent circuit phase response. 6. said deriving includes: adjusting a product of inductance $L_S$ with capacitance $C_S$ based on a comparison of the average frequency between said valley and peak with that of the equivalent circuit phase response. 7. said deriving includes: adjusting a ratio of inductance $L_S$ to capacitance $C_S$ based on a comparison of the frequency difference between said valley and peak with that of the equivalent circuit phase response. 8. said deriving includes: adjusting the resistance $R_S$ based on a comparison of a phase difference between said valley and peak with that of the equivalent circuit phase response. 9. the echo detection includes accounting for the sideband imbalance.

BRIEF DESCRIPTION OF THE DRAWINGS

FIG. 8 is a flow diagram for an illustrative sensing method.

DETAILED DESCRIPTION

It should be understood that the drawings and corresponding detailed description do not limit the disclosure, but on the contrary, they provide the foundation for understanding all modifications, equivalents, and alternatives falling within the scope of the appended claims.

Figure 1:
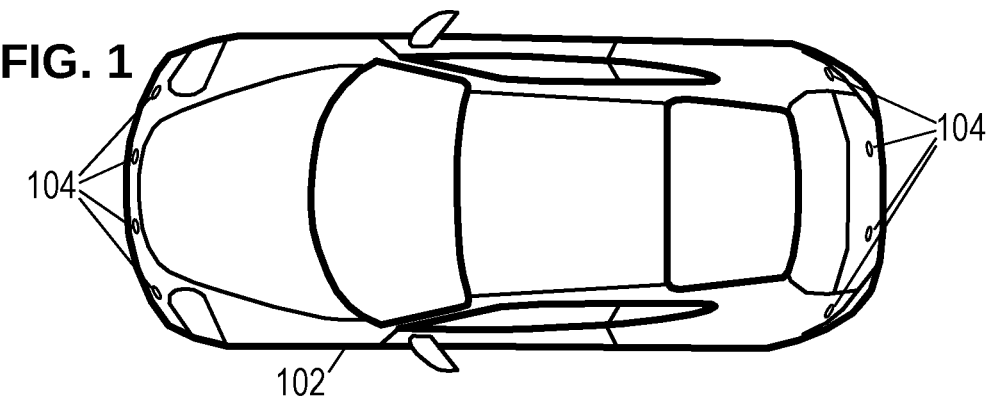
FIG. 1 is an overhead view of an illustrative vehicle equipped with piezoelectric-based sensors.

As an illustrative usage context, FIG. 1 shows a vehicle 102 equipped with a set of piezoelectric-based sensors 104. The number and configuration of sensors in the sensor arrangement varies, and it would not be unusual to have six sensors on each bumper with two additional sensors on each side for blind-spot detectors on each side. The vehicle may employ the sensor arrangement for detecting and measuring distances to objects in the various detection zones, potentially using the sensors for individual measurements as well as cooperative (e.g., triangulation, multi-receiver) measurements.

The piezoelectric-based sensors are transceivers, meaning that each sensor can transmit and receive bursts of acoustic energy. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However multiple simultaneous transmissions can be supported, e.g., as described in co-pending application Ser. No. 15/888,471 ("Composite Acoustic Bursts for Multichannel Sensing"), or through the use of orthogonal waveforms or transmissions to non-overlapping detection zones.

Figure 2:
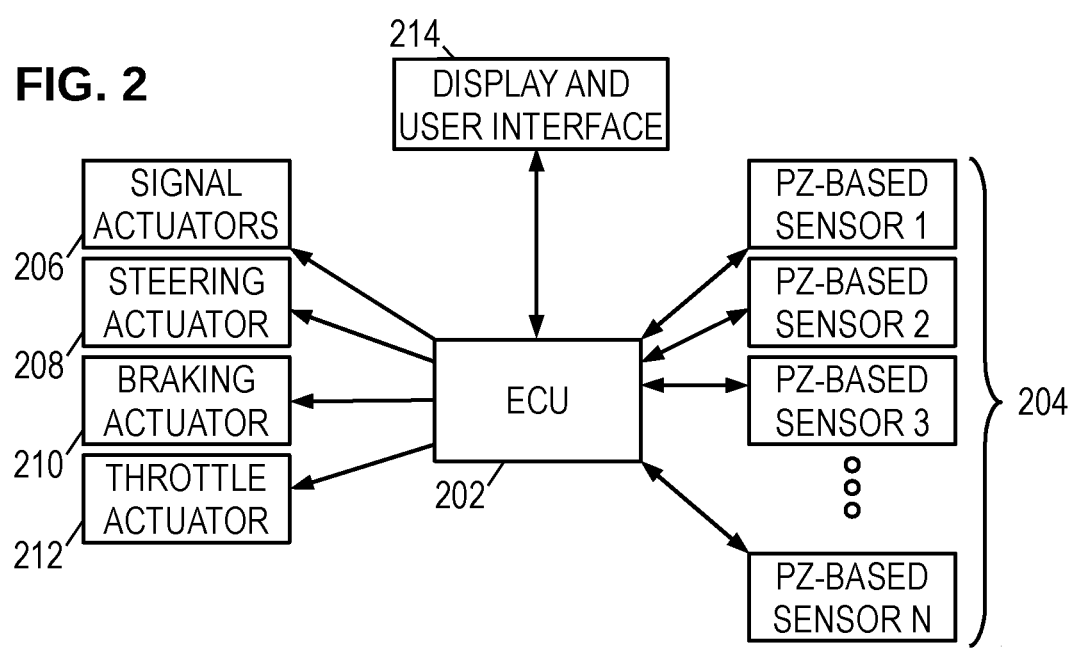
FIG. 2 is a block diagram of an illustrative parking assist system.

FIG. 2 shows an electronic control unit (ECU) 202 coupled to the various piezoelectric-based sensors 204 as the center of a star topology. Of course, other communication bus topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features.

Figure 3:
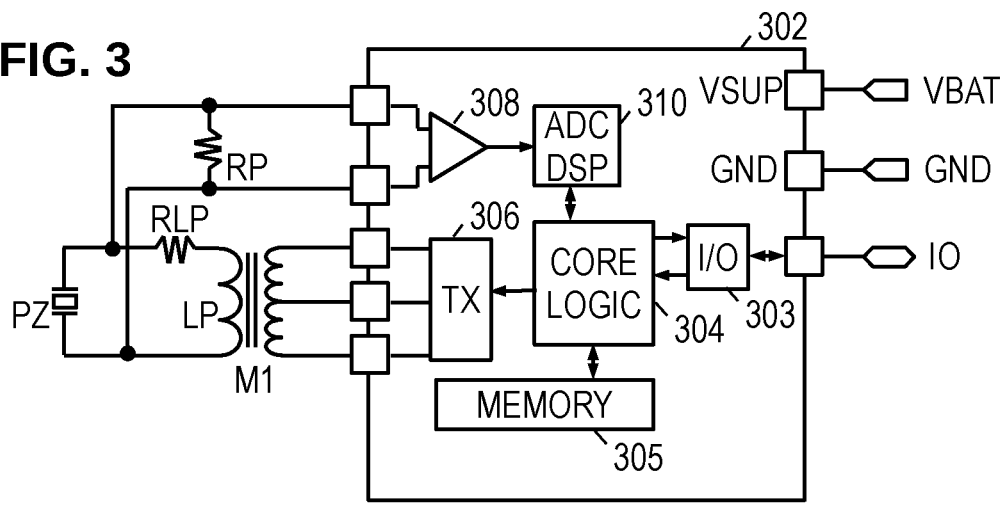
FIG. 3 is a circuit schematic of an illustrative piezoelectric-based sensor.

One potential sensor configuration is now described with reference to FIGS. 3 and 4. In practice, the sensors may employ any of a number of suitable communication and power supply techniques such as those provided in the DSI3, LIN, and CAN standards. Some of these standards support data communication via the power conductors, or via multiple bus conductors. However, in the illustrated embodiment of FIG. 3, the sensor controller 302 connects only to two power terminals (Vbat and GND) and a single input/output ("I/O" or "IO") line for bidirectional communication with the ECU 202.

The sensor controller 302 includes an I/O interface 303 that, when placed in a recessive mode, monitors the I/O line for communication from the ECU 202 and, when placed in a dominant mode, drives the I/O line to send measurements or other information to the ECU 202.

The sensor controller 302 includes a core logic 304 that operates in accordance with firmware and parameters stored in nonvolatile memory 305 to parse commands from the ECU and carry out the appropriate operations, including the transmission and reception of acoustic bursts (typically in the ultrasonic range). To transmit an acoustic burst, the core logic 304 is coupled to a transmitter 306 which drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). A parallel resistor $R_P$ damps residual vibrations of the piezoelectric element.

As used herein, the term "piezoelectric transducer" includes not only the piezoelectric element, but also the supporting circuit elements for driving, tuning, and receiving from, the piezoelectric element. In the illustrative embodiment, these supporting elements are the transformer M1, the parallel resistor, and any tuning or DC-isolation capacitances. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements.

The terminals of the piezoelectric element PZ are coupled to the sensor controller's pair of receive terminals. As the received echo signals are typically in the millivolt or microvolt range, a low-noise amplifier 308 amplifies the signal from the receive terminals. When the piezoelectric element is being actively driven by the transmitter, the amplifier's input may be clamped and/or the output may be allowed to saturate at the internal supply voltage. The amplified receive signal is digitized and processed by a digital signal processor (DSP) 310 with an integrated analog-to-digital converter (ADC).

DSP 310 applies programmable methods to process the signal from the piezoelectric element to, e.g., measure the actuation period of the piezoelectric transducer during the transmission of a burst (including the ensuing reverberation or "ringing" period), and to detect and measure the timing of any received bursts or "echoes". Such methods may employ filtering, correlation, threshold comparisons, minimum intervals, peak detections, zero-crossing detection and counting, noise level determinations, and other customizable techniques tailored for improving reliability and accuracy. The DSP 310 may further process the amplified receive signal to analyze characteristics of the transducer, such as the transducer's phase response.

Figure 4:
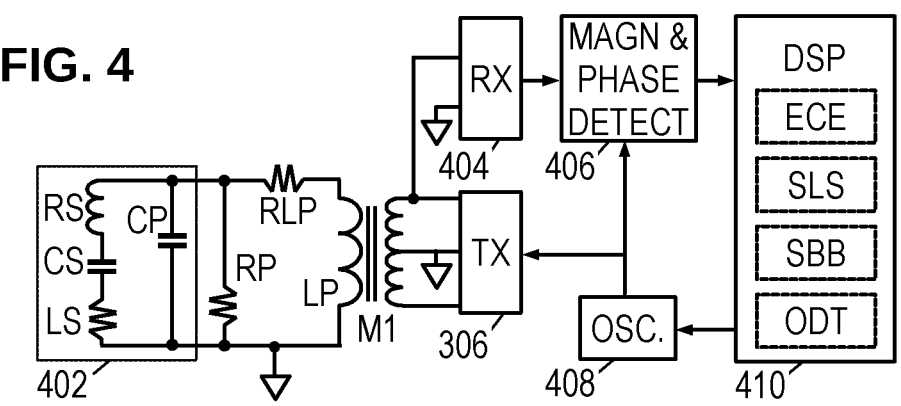
FIG. 4 is a block diagram of a sensor having an equivalent circuit for a piezoelectric transducer.

FIG. 4 is a block diagram in which the piezoelectric element PZ is replaced by an equivalent circuit 402 representing the element as a parallel capacitor $C_P$ coupled in parallel with a series combination of a series inductor $L_S$, a series capacitor $C_S$, and a series resistor $R_S$. The series combination represents mechanical action of the piezoelectric element, with $R_S$ representing the element's energy loss (which during normal operation is primarily due to the radiated acoustic energy). FIG. 4 also shows a parasitic inductance $L_P$ and parasitic resistance $R_{LP}$ of the transformer's secondary winding. A receiver 404 receives and amplifies the voltage signal from the equivalent circuit 402. The amplified signal's magnitude and phase (or alternatively, the in-phase and quadrature phase components) are measured by a detector 406, using the signal from oscillator 408 as the phase reference. The measured phase is the difference between the transmit (tx current) signal and the receive (rx voltage) signal. A DSP 410 operates on the detector measurements to, e.g., perform equivalent circuit estimation ("ECE"), system level selectivity ("SLS") determination, sideband balancing ("SBB"), and obstacle detection & tracking ("ODT").

Figure 5:
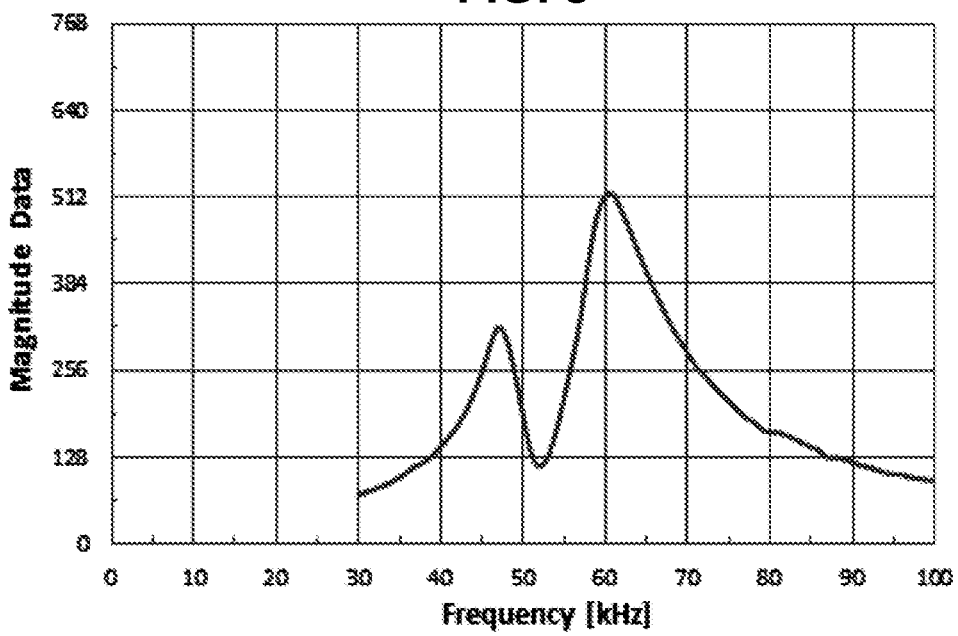
FIG. 5 is a graph of an illustrative magnitude response.

FIG. 5 shows an illustrative magnitude response as a function of frequency. The illustrated response represents a positive peak (corresponding to a parallel resonance frequency of $C_P$ and $L_P$) partially reduced by a negative peak or valley (corresponding to a serial resonance frequency of $C_S$ and $L_S$). In at least some embodiments, the acoustic bursts are at least approximately centered at the serial resonance frequency, though some signal energy may be transmitted on either side of the central frequency band to enable concurrent burst transmissions to be distinguished by source, e.g., as described in related application Ser. No. 15/888,471 ("Composite Acoustic Bursts for Multi-channel Sensing").

It should be noted that the transducer's response will typically vary, e.g., as a function of temperature, age, and/or accumulation of material on the transducer housing. Such variation may cause the sideband response of the transducer to become unbalanced, potentially reducing the time-of-flight measurement accuracy if the imbalance is not compensated or otherwise accounted for. In at least some embodiments, the controller performs a calibration of the piezoelectric transducer by, among other things, measuring the transducer's response as a function of frequency. As a practical matter, the controller may not be able to measure the magnitude response in the field due to input clamping and/or output saturation of the receive amplifiers. But even with such effects, the controller is still able to determine the phase response as a function of frequency by comparing the timing of transitions or zero-crossings.

Figure 6:
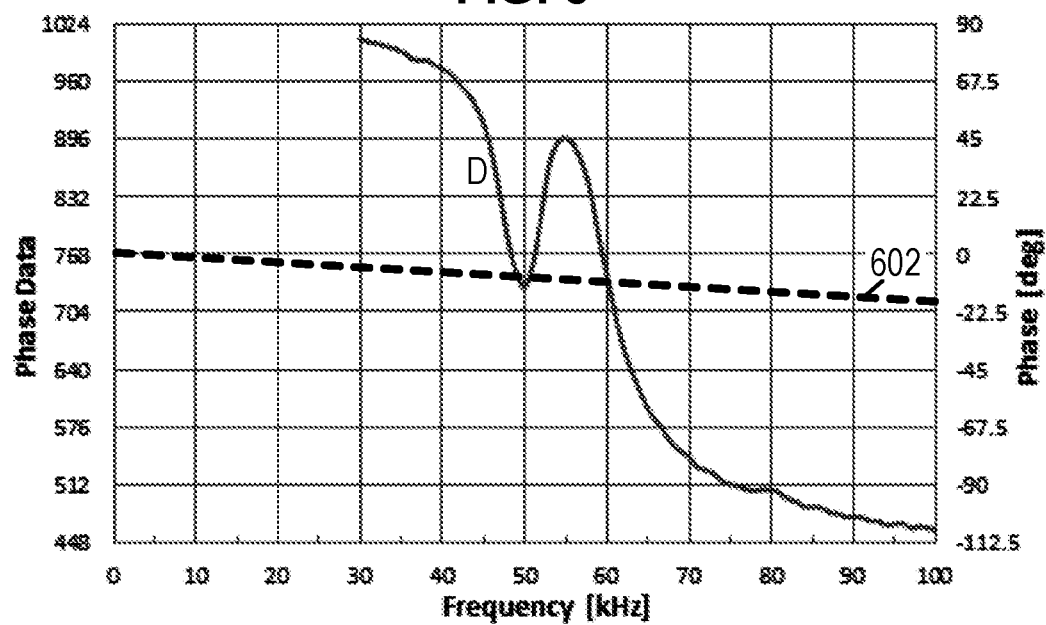
FIG. 6 is a graph of an illustrative phase response.

FIG. 6 shows an illustrative phase response curve D, which may be measured by the controller during a calibration operation. The measured phase response curve primarily reflects the response of the piezoelectric transducer, but may also include a linear phase error 602 caused by group delay of the transmitter and receiver. The linear phase error 602 is preferably estimated and subtracted from the measured phase response to obtain a corrected phase response curve as discussed further below. (More generally, some of the components may introduce a nonlinear phase error, and it is contemplated that at least some embodiments will estimate and remove phase errors that are nonlinear.)

Figure 7A:
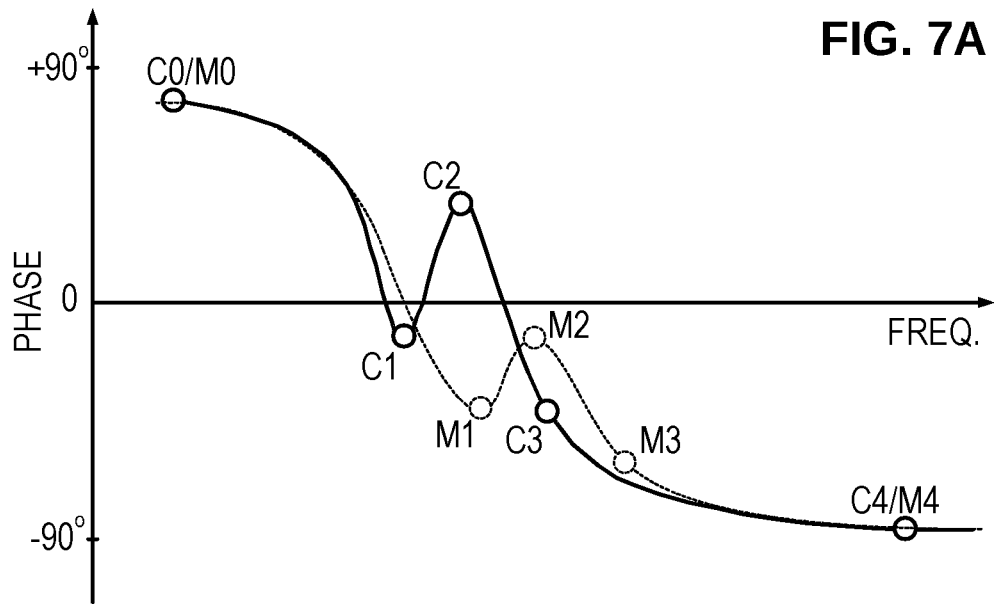
FIG. 7A is a graph of a corrected phase response and a model phase response.

In solid line, FIG. 7A shows an illustrative corrected phase response curve C, and in broken line, FIG. 7A also shows an illustrative phase response curve M derived from an equivalent circuit model of the piezoelectric transducer. Five points are shown on each curve: a low frequency endpoint $C_0$, $M_0$; a local minimum (valley) point $C_1$, $M_1$; a local maximum (peak) point $C_2$, $M_2$; an offset point $C_3$, $M_3$; and a high frequency endpoint $C_4$, $M_4$.

The low frequency endpoint measurement is at a predetermined frequency on the low end of the transmitter's operating range at a point comfortably below the expected resonance frequencies of the transducer and thus where the phase response is expected to be primarily inductive, e.g., 30 kHz. Conversely, the high frequency endpoint measurement is at a predetermined frequency on the high end of the transmitter's operating range at a point comfortably above the expected resonance frequencies and thus where the phase response is expected to be primarily capacitive, e.g., 90 kHz. The endpoints may be measured with single-frequency transmit pulses.

The local minimum and local maximum may be identified using a frequency sweep (e.g., a chirp), and will be found on either side of the serial resonance frequency. (In the present example, the serial resonance frequency for the transducer is about 52 kHz, and a frequency sweep is performed from 10 kHz below the manufacturer-specified resonance frequency to 10 kHz above the manufacturer-specified resonance frequency.) The offset point is at a predetermined frequency offset from the manufacturer-specified resonance frequency, in this example 62 kHz (the upper end of the frequency sweep).

Though they have been illustrated with respect to the corrected phase response curve C and equivalent circuit model response M, the endpoints, valley, peak, and offset points are first determined the measured phase response curve D, yielding phase measurements $D_0$ thru $D_4$ and frequency determinations for $D_1$ and $D_2$ (i.e., $f_{D1}$ and $F_{D2}$). The corresponding values for the equivalent circuit model ($M_0$ thru $M_4$, $f_{M1}$, and $f_{M2}$) may be determined analytically or numerically.

The corrected phase response curve measurements ($C_0$ thru $C_4$) may then be determined as follows. Define the linear phase error as the line between ($f_0$, $D_0$-$M_0$) and ($f_4$, $D_4$-$M_4$). Subtract this linear phase error from $D_0$ thru $D_4$ to obtain $C_0$ thru $C_4$. (Since the correction is defined relative to $D_0$ and $D_4$, $C_0$=$M_0$ and $C_4$=$M_4$.) For the remaining points, the proportion $k=(f_i-f_0)/(f_4-f_0)$ is used:

$$C_i = [M_0 + k^*(M_4-M_0)] + [D_i - D_0 - k^*(D_4-D_0)]$$

Figure 7B:
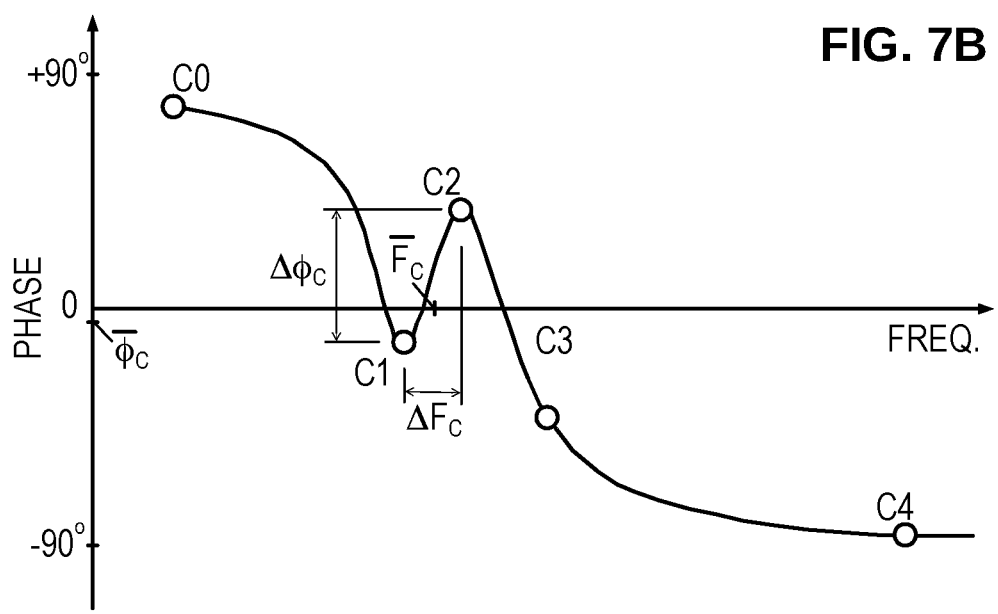
FIG. 7B is a graph showing four measurements from a phase response.

FIG. 7B shows four measurements that may be derived from corrected phase response curve measurements $C_1$, $C_2$, and $C_3$. Corresponding measurements will be derived from the equivalent circuit model phase response values $M_1$, $M_2$, and $M_3$. The first is an average phase $\overline{\phi_C} = \Sigma_{i=1}^{3} a_i C_i$, where $a_i$ are weighted sum coefficients that add to unity. For example, each $a_i$ may equal ⅓. As another alternative, $a_2$ may be 0.5 while $a_1$ and $a_3$ each equal 0.25. The difference between this average phase for the corrected phase response and the corresponding average phase for the model phase response may serve as an indicator of error in the estimated value of the parallel capacitance $C_P$ in the equivalent circuit model.

A second measurement is an average frequency $$\overline{f_C} = \frac{f_{C1} + f_{C2}}{2}.$$

The difference between this average frequency and the corresponding average frequency $$\overline{f_M} = \frac{f_{M1} + f_{M2}}{2}$$

may serve as an indicator of error in the estimated serial resonance frequency (and hence the error in the product $L_S C_S$) in the equivalent circuit model.

A third measurement is a frequency delta $\Delta f_C = f_{C2} - f_{C1}$. The difference between this frequency delta and the corresponding frequency delta $\Delta f_M = f_{M2} - f_{M1}$ may serve as an indicator of error in the estimated serial resonance quality factor Q (and hence the error in the ratio $L_S/C_S$) in the equivalent circuit model.

A fourth measurement is a phase delta $\Delta \phi_C = C_2 - C_1$. The difference between this phase delta and the corresponding phase delta $\Delta \phi_M = M_2 - M_1$ may serve as an indicator of error in the estimated value of serial resistance $R_S$ in the equivalent circuit model.

FIG. 8 is a flow diagram of a sensor control method that employs the foregoing measurements. The method begins in block 802 with the initialization of the equivalent circuit model parameters. The parameters may be set based on initial values stored in firmware for a "typical" transducer response. Alternatively, the sensor transducer may be characterized at the factory to determine initial parameter values. The parameters may be $R_S$, $L_S$, $C_S$, and $C_P$, or various combinations thereof. In some variations, the parameters are $R_S$, $C_P$, $Q_S$ (a resonance quality factor that depends on the ratio $L_S/C_S$) and $f_S$ (a resonance frequency that depends on the product $L_SC_S$). With the parameter values known, the model phase response values $M_0$ thru $M_4$ are determined analytically or by numerical solution. The four measurements discussed above are also determined (average phase, average frequency, frequency delta, and phase delta).

In block 804, the controller measures $D_0$, $D_4$, the phase response at the upper and lower ends of the transmitter's frequency range. In block 806, the controller measures the phase of the transducer's response to a chirp, e.g., a frequency sweep from about 10 kHz below the expected serial resonance frequency to about 10 kHz above. In block 808, the controller identifies from the chirp response the valley frequency $f_{C1}$ ($=f_{D1}$), the peak frequency $f_{C2}$ ($=f_{D2}$), and (if it isn't predetermined) the offset frequency $f_{C3}$. In block 810, the controller extracts the phase responses at the relevant frequencies ($D_1$ thru $D_3$). In block 812, the controller applies the linear phase correction to $D_1$ thru $D_3$ to obtain $C_1$ thru $C_3$, and finds the four measurements (average phase, average frequency, frequency delta, and phase delta).

In block 814, the controller compares the average phases of the corrected phase response and the equivalent circuit model phase response. If they don't match, the controller adjusts the parallel capacitance $C_P$ in block 815. (E.g., if the average phase for the model is too low, the parallel capacitance $C_P$ is reduced.) This adjustment and the other parameter adjustments may be performed in accordance with well-known adaptation techniques.

In block 816, the controller compares the average frequencies of the corrected phase response and the equivalent circuit model phase response. If they don't match, the controller adjusts the product $L_SC_S$ in block 817. (E.g., if the average frequency for the model is too high, the product is increased.)

In block 818, the controller compares the frequency deltas of the corrected phase response and the equivalent circuit model phase response. If they don't match, the controller adjusts the ratio $L_S/C_S$ in block 819. (E.g., if the frequency delta for the model is too low, the ratio is increased.)

In block 820, the controller compares the phase deltas of the corrected phase response and the equivalent circuit model phase response. If they don't match, the controller adjusts the resistance $R_S$ in block 821. (E.g., if the phase delta for the model is too low, the resistance is decreased.)

In block 822, the controller determines whether any parameter adjustments were made, and if so, blocks 812-822 are repeated using the updated model parameters. In early experiments, it has been determined that convergence is usually achieved within five iterations.

Once a sufficient match is achieved, the controller uses the equivalent circuit model in block 824 to estimate the system level selectivity (SLS) curve as the product of the serial resistance $R_S$ with the current through the serial resistance $I_S$ as a function of frequency. More particularly, the magnitude responses at the sideband frequencies are determined.

In block 826, the sideband responses are compared. If an imbalance is detected, the controller adjusts the transmit frequencies, adjusts the transmit current magnitudes, and/or adjusts the filter responses in the receive chain to rebalance the sideband responses. Thereafter, the controller performs measurements with echo-detection processing and optional monitoring of detected obstacles in block 828. One suitable measurement technique can be found in the related application Ser. No. 15/888,471 ("Composite Acoustic Bursts for Multi-channel Sensing").

Periodically, the controller repeats blocks 802-827 to identify and accommodate variations in the transducer response.

Though the operations shown and described in FIG. 8 are treated as being sequential for explanatory purposes, in practice the method may be carried out by multiple integrated circuit components operating concurrently and perhaps even speculatively to enable out-of-order operations. The sequential discussion is not meant to be limiting. Moreover, the foregoing description may omit complicating factors such as parasitic impedances, current-limiting resistors, level-shifters, line clamps, etc., which may be present but do not meaningfully impact the operation of the disclosed circuits. Still further, the focus of the foregoing discussions has been ultrasonic sensors, but the principles are applicable to any acoustic sensors or other pulse-echo transducers that may potentially benefit from identifying and accommodating variations in the transducer response. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A controller for a piezoelectric transducer, the controller comprising:
   a transmitter that drives the piezoelectric transducer;
   a receiver that senses a response of the piezoelectric transducer; and
   a processing circuit coupled to the transmitter and to the receiver to perform calibration and echo detection, the calibration including:
      sensing the piezoelectric transducer's phase response as a function of frequency;
      deriving equivalent circuit parameters for the piezoelectric transducer from the phase response; and
      determining a sideband imbalance based on one or more of the equivalent circuit parameters.

2. The controller of claim 1, wherein the equivalent circuit parameters include a capacitance $C_S$, an inductance $L_S$, and a resistance $R_S$ of a series branch and a capacitance $C_P$ of a capacitor in parallel with the series branch.

3. The controller of claim 2, wherein the parameters are for an equivalent circuit that further includes an inductance $L_P$ of an inductor in parallel with the series branch and a resistance $R_{LP}$ of said inductor.

4. The controller of claim 1, wherein said deriving includes:
   determining a linear phase correction for the sensed phase response based on a comparison of points on the sensed phase response with points on an equivalent circuit phase response.

5. The controller of claim 1, wherein said deriving includes:
   finding a peak in the sensed phase response;
   determining an average phase for said peak; and
   adjusting the capacitance $C_P$ based on a comparison of the average phase for the peak of the sensed phase response to an average phase for the peak of an equivalent circuit phase response.

6. The controller of claim 5, wherein said determining an average phase includes finding a valley in the sensed phase response, and wherein said deriving further includes:
  determining an average frequency between said valley and said peak; and
  adjusting a product of inductance $L_S$ with capacitance $C_S$ based on a comparison of said average frequency with that of the equivalent circuit phase response.

7. The controller of claim 6, wherein said deriving further includes:
  determining a frequency difference between said valley and said peak; and
  adjusting a ratio of inductance $L_S$ to capacitance $C_S$ based on a comparison of said frequency difference with that of the equivalent circuit phase response.

8. The controller of claim 7, wherein said deriving further includes:
  determining a phase difference between said valley and said peak; and
  adjusting the resistance $R_S$ based on a comparison of said phase difference with that of the equivalent circuit phase response.

9. The controller of claim 1, wherein said echo detection includes accounting for the sideband imbalance.

10. A method of operating a piezoelectric-based sensor, the method comprising:
  sensing a phase response of a piezoelectric transducer as a function of frequency;
  deriving equivalent circuit parameters for the piezoelectric transducer from the phase response;
  determining a sideband imbalance based on one or more of the equivalent circuit parameters; and
  performing echo-detection processing that accounts for the sideband imbalance.

11. The method of claim 10, wherein the equivalent circuit parameters include a capacitance $C_S$, an inductance $L_S$, and a resistance $R_S$ of a series branch and a capacitance $C_P$ of a capacitor in parallel with the series branch.

12. The method of claim 10, wherein said deriving includes:
  determining a linear phase correction for the sensed phase response based on a comparison of points on the sensed phase response with points on an equivalent circuit phase response.

13. The method of claim 10, wherein said deriving includes:
  finding a peak in the sensed phase response;
  determining an average phase for said peak; and
  adjusting the capacitance $C_P$ based on a comparison of the average phase for the peak of the sensed phase response to an average phase for the peak of an equivalent circuit phase response.

14. The method of claim 13, wherein said determining an average phase includes finding a valley in the sensed phase response, and wherein said deriving further includes:
  determining an average frequency between said valley and said peak; and
  adjusting a product of inductance $L_S$ with capacitance $C_S$ based on a comparison of said average frequency with that of the equivalent circuit phase response.

15. The method of claim 14, wherein said deriving further includes:
  determining a frequency difference between said valley and said peak; and
  adjusting a ratio of inductance $L_S$ to capacitance $C_S$ based on a comparison of said frequency difference with that of the equivalent circuit phase response.

16. The method of claim 15, wherein said deriving further includes:
  determining a phase difference between said valley and said peak; and
  adjusting the resistance $R_S$ based on a comparison of said phase difference with that of the equivalent circuit phase response.

17. A sensor that comprises:
  a piezoelectric transducer; and
  a controller that drives the piezoelectric transducer and that senses a phase response of the piezoelectric transducer as a function of frequency, the controller including a processing circuit that accounts for an estimated sideband imbalance when performing echo-detection processing, the sideband imbalance being estimated based on equivalent circuit parameters derived from the phase response.

18. The sensor of claim 17, wherein the phase response includes a phase correction based on a comparison of the sensed phase response with an equivalent circuit phase response.

19. The sensor of claim 18, wherein the equivalent circuit parameters include a capacitance $C_S$, an inductance $L_S$, and a resistance $R_S$ of a series branch and a capacitance $C_P$ of a capacitor in parallel with the series branch.

20. The sensor of claim 19, wherein said equivalent circuit parameters are derived in part by:
  finding a peak in the sensed phase response;
  finding a valley in the sensed phase response;
  determining a phase difference between said valley and said peak; and
  adjusting the resistance $R_S$ based on a comparison of said phase difference with that of the equivalent circuit phase response.

* * * * *